United States Patent [19]

McLean

[11] 4,202,422
[45] May 13, 1980

[54] SAFETY LOCK FOR AGRICULTURAL WINDROWER OR THE LIKE

[75] Inventor: Kenneth W. McLean, New Holland, Pa.

[73] Assignee: Sperry Rand Corporation, New Holland, Pa.

[21] Appl. No.: 936,161

[22] Filed: Aug. 23, 1978

[51] Int. Cl.² .................. B62D 11/02; B60R 21/14
[52] U.S. Cl. ........................ 180/6.48; 74/471 R; 180/77 R; 180/271
[58] Field of Search ............ 180/6.48, 77 R, 77 H, 180/82 A, 271; 74/471 XY, 471 R

[56] References Cited

U.S. PATENT DOCUMENTS

| 3,528,519 | 9/1970 | Case | 180/6.48 |
|---|---|---|---|
| 3,563,109 | 2/1971 | Glass | 180/6.48 |
| 3,712,403 | 1/1973 | Pakosh | 180/6.48 |
| 3,777,833 | 12/1973 | Koch | 180/6.48 |
| 3,942,602 | 3/1976 | Case | 180/82 A |

*Primary Examiner*—John P. Silverstrim

*Attorney, Agent, or Firm*—C. Hercus Just; Frank A. Seemar; John B. Mitchell

[57] ABSTRACT

A safety lock for an agricultural windrower and/or conditioner comprising a self-propelled machine having a pair of drive wheels respectively powered by individual hydraulic motors each powered by separate hydraulic pumps driven by a fuel powered motor, the pumps being variable for driving the motors at desired speeds and directions to comprise a hydrostatic steering system for said machine, said pumps being variable by a rotatable steering wheel, and a speed control level also is movable to cause actuation of both pumps equally and also actuates lock pins which secure the steering wheel in neutral position. The safety feature is effected by the speed control lever being biased into a latching notch when the steering wheel is moved to neutral position and thereby moves the lock pins automatically into locking position relative to holes in plates associated with linkage between the column of the steering wheel and said hydraulic pumps.

8 Claims, 10 Drawing Figures

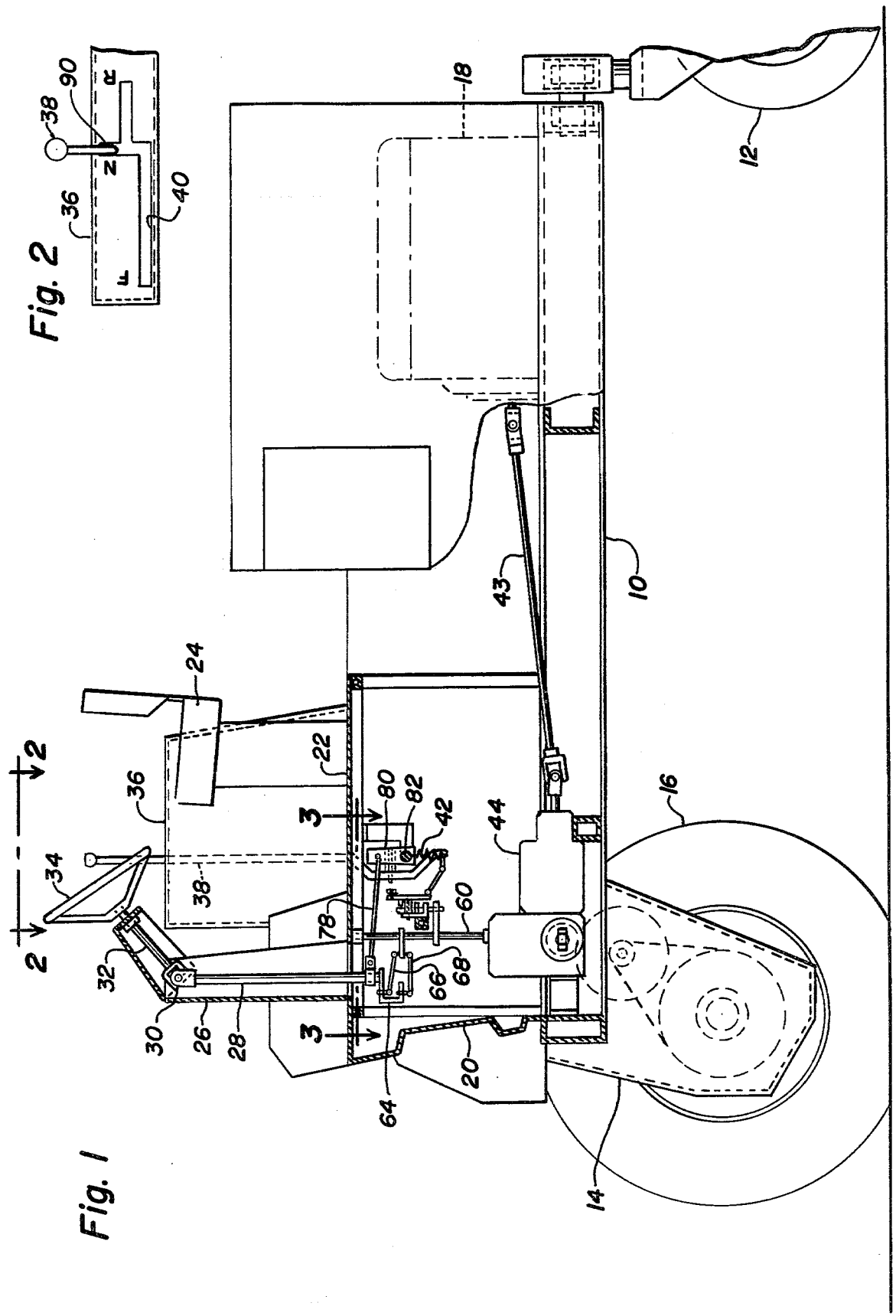

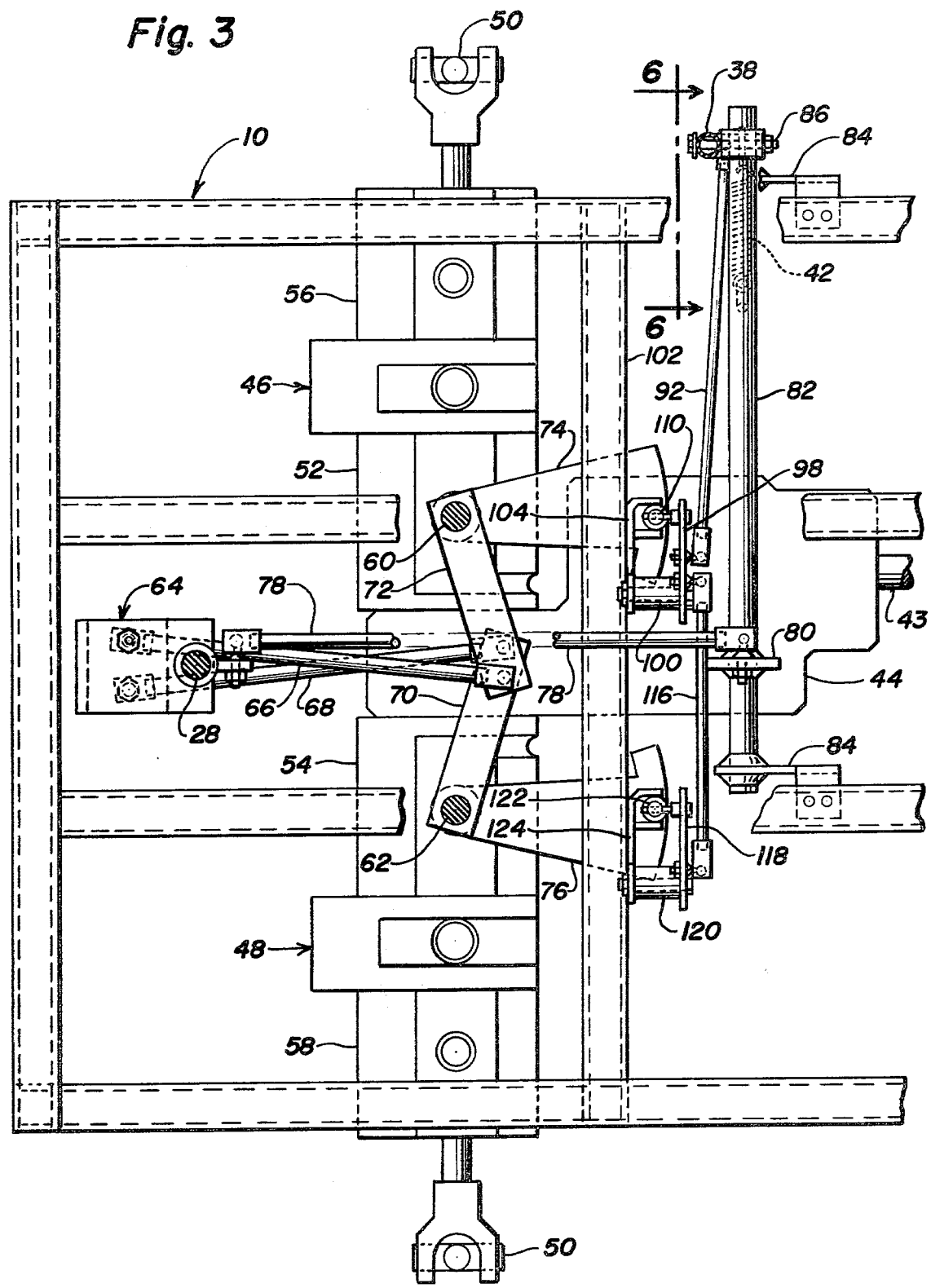

SAFETY LOCK FOR AGRICULTURAL WINDROWER OR THE LIKE

BACKGROUND OF THE INVENTION

For many years it was common practice to mow hay and other forage crops with a mower, such as a sickle bar, let the crop lie in the field for a sufficient period to reasonably dry the same, and then utilize a windrower, usually pulled by a tractor, to dispose the cut and at least partially-dried crop into a windrow in order that a baler could be employed to pick up the windrow and convert the same into bales of the crop. One reason for letting the crop lie in the field to dry was especially for purposes of letting the stalks dry a sufficient amount in order that the material when baled would not be subject to mold or internal combustion.

To obviate the need for letting the crop lie in the field to dry as described above, more recent practice has employed a self-propelled windrower or combination windrower and stalk conditioner which, in general, are of several types. A windrower per se has a head of substantial width and a cutter bar extends across the full length of the forward edge thereof. A consolidating auger also is included in the machine which is as wide as the cutter bar and this consolidates the material into a relatively narrow windrow which lies upon the field. To enhance the drying of the material, a windrower of this type also can include conditioning rollers which are actually a pair of crushing rollers that engage the material after being consolidated by the auger and crush the stems and stalks of the material and then discharge the same in the form of a windrow upon the field.

In a combination mower-conditioner, said machines also have a head of substantial width and a cutter extends across the full length of the forward edge thereof. A reel of the same length as the cutter engages the cut material and moves it rearwardly into contact with conditioning rollers which coact to crush the stems and stalks of the material, said rollers being of substantially the same width as the cutter and reel. Consolidation of the conditioned material is effected by angular baffles extending inward and rearwardly within the head and function to discharge the material into a windrow after discharge from the conditioning rollers and engagement by the baffles.

In both of the above descriptions of machines, drive wheels are provided thereon which are driven by an internal combustion engine, such as a diesel engine or otherwise, that operates hydraulic pumps interconnected to individual hydraulic motors respectively connected to the drive wheels to rotate the same independently of each other. By controlling the relative speeds of said drive wheels and/or the direction of rotation thereof, turning of the machine can be effected as distinguished from employing a steering wheel or wheels as in certain other types of agricultural equipment. In a mower-conditioner, the drive wheels are spaced farther apart than in a windrower to permit leaving a swath of the cut material as distinguished from a relatively narrow windrow, whereas in a windrower, the drive wheels are closer together than in a mower-conditioner because only a relatively narrow windrow is produced by the windrower. However, in view of the fact that the present invention is concerned with safety means associated with the control of the speed and directions of the drive wheels, several different embodiments of safety means are respectively provided by the present invention for use on windrowers and mower-conditioners. Hence, in windrowers, the pumps are near the wheels and the motors are closer together than in mower-conditioners.

To illustrate the type of machines to which the safety mechanism, comprising the essential aspects of the present invention, applies, attention is directed to U.S. Pat. No. 3,563,109 to Glass et al, dated Feb. 16, 1971, and U.S. Pat. No. 3,777,833, to Koch, dated Dec. 11, 1973. In these patents, it will be seen that pairs of drive wheels are employed which are actuated by hydraulic motors powered by hydraulic pumps and individually controlled as to speed and direction by a steering column interconnected by links to the hydraulic pumps, and a speed control lever also is manually operable to control the delivery of hydraulic fluid to the motors equally. In the Glass et al patent, a latching plate is engageable by the speed control lever to maintain the same in a desired operative position but the same is moved manually incident to the latching plate and no automatic positioning of the same in neutral is provided.

In the Koch machine, a steering column having a steering wheel on the upper end thereof is rotatable to control the speed of the hydraulic motors individually connected to the drive wheels by determining the discharge of the pumps to the motors and thereby effect hydrostatic steering, as in the Glass et al machine. In addition, a speed control lever is manually operated and normally is held at a given speed by engaging one of a series of spaced notches in a rack. There is no means included for latching the steering wheel in neutral position or otherwise, whereby accidental movement of the steering wheel in either the Glass et al or Koch machine from the neutral position thereof, will cause driving of the machine to be effected and thereby, can result in personal or property damage.

The publication identified as MacDon "SELF-PROPELLED HYDROSTATIC SWATHER-WINDROWER" exists, and a copy thereof is furnished with the instant application. This publication is distributed by MacDon Industries, Ltd., 680 Moray Street, Winnipeg, Manitoba R3J3S3 Canada, the publication being identified as issued June, 1976. A list of components and an expanded illustration of the various arrangements of the components indicates a locking pin adapted to be inserted by a speed control lever into a hole in a plate associated with the steering mechanism, presumably for safety purposes. However, there appears to be no means for biasing the speed control lever to neutral position or otherwise.

SUMMARY OF THE INVENTION

It is the principal object of the present invention to provide safety locking means of the type which is operated by the speed control lever of either a windrower or a mower-conditioner, said lever controlling the operation of the locking pins respectively insertable into openings in parts of the control mechanism for the hydraulic pumps individually associated with the hydraulic motors respectively connected to the drive wheels at opposite sides of the machine, biasing means also being associated with the speed control lever and arranged to urge the same into a locking notch when the steering wheel is moved to neutral position, whereupon the biasing of the speed control lever serves to positively move the locking pins into the apertures which receive the same in the steering mechanism. This results in effectively preventing accidental movement of the machine with its attending possibilities of either personal or property damage.

It is a further object of the invention to provide safety locking mechanism for either a windrower or mower-conditioner in which the drive wheels and correspondingly, the hydraulic motors and pumps, are spaced transversely apart different distances and in order to adapt the latching mechanism of the type described above respectively to said machines, it is found necessary to have the locking pins move in horizontal direction in the mechanism for one machine and in vertical direction in the mechanism for the other machine.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a side elevation of a typical windrower of the type to which the present invention pertains, part of the rear wheel thereof being broken away to accommodate the view to the sheet.

FIG. 2 is a fragmentary plan view of part of the structure shown in FIG. 1 as seen on the line 2—2 thereof.

FIG. 3 is a horizontal sectional view of part of the interior of the mechanism shown in FIG. 1 and illustrated on a larger scale than in FIG. 1, as seen on the line 3—3 thereof.

DETAILED DESCRIPTION

Figure 4:
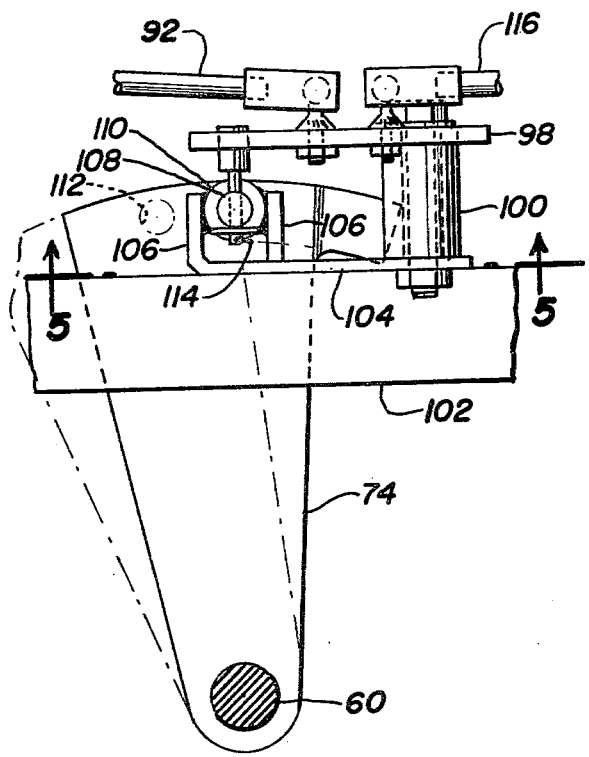
FIG. 4 is a fragmentary, vertical sectional elevation of other details of the mechanism shown in FIG. 3, as seen on the line 4—4 thereof.

Referring to FIG. 1, there is illustrated therein a typical vertical elevation of either a windrower or a mower-conditioner, the overall structure being similar in both types of machines but the difference lying in the distance that the drive wheels are spaced apart. In a windrower, the drive wheels are closer together than in a mower-conditioner and in view of the fact that the hydrostatic unit associated with each drive wheel preferably is located adjacent said wheels, said hydrostatic units which each comprise a combination hydraulic motor and pump, are spaced apart different distances in the respective machines and this requires different apparatus and mechanism to control the same, particularly for purposes of the present invention, to illustrate details of the safety mechanism comprising the primary object of the invention.

Referring to FIG. 1, a main horizontal frame 10 has a pair of trailing rear wheels 12, which are supported in a pair of spaced yokes at the rear end of the frame 10 and a pair of legs 14 respectively extending down from the forward end of frame 10 and transversely spaced apart, respectively support forward or front drive wheels 16 which are of a larger diameter than the rear wheels 12. Frame 10 also supports a conventional power source, such as a diesel engine 18, shown in phantom in FIG. 1. A housing 20 on main frame 10 is surmounted by a floor 22 upon which a seat 24 is mounted for the driver of the machine. Post means 26 support a rotatable steering shaft 28, the upper end of which is connected by a universal joint 30 to a short angular steering shaft 32 to which a steering wheel 34 is connected.

Also projecting upwardly from the floor 22 is a narrow supplemental housing 36 within which a vertical speed control lever 38 is contained, the lower end thereof being swivelly supported by mechanism immediately below floor 22. The upper surface of supplemental housing 36 is provided with angularly related branches of slot means 40 within which the upper portion of speed control lever 38 is movable, a transverse intermediate portion thereof comprising the neutral position for the lever and to which it is normally biased by a spring 42, shown in FIGS. 1, 3, 6 and 7.

A drive shaft 43 extends from engine 18 to a gear housing 44, shown in FIGS. 1 and 3, the forward end of which is associated respectively with hydrostatic units 46 and 48 for purposes of energizing the drive wheels 16 which respectively are connected to the units 46 and 48 by universal joints 50, shown in FIG. 3. The units 46 and 48 each comprise hydraulic pumps 52 and 54, directly associated respectively with hydraulic motors 56 and 58 to which the universal joints 50 are connected. The hydraulic pumps 52 and 54 respectively have vertical shafts 60 and 62 extending therefrom for controlling individually the supply of hydraulic fluid respectively to the motors 56 and 58 and thereby effect steering of the machine in hydrostatic manner as distinguished from employing conventional steering mechanism either by support of the drive wheels upon vertical shafts and utilizing conventional linkage, tie rods, and the like, or by steering the machine through the trailing rear wheels, for example. Further, the hydraulic pumps and motors are of the reversible type in order to move the drive wheels 16 either forward or rearward.

Figure 8:
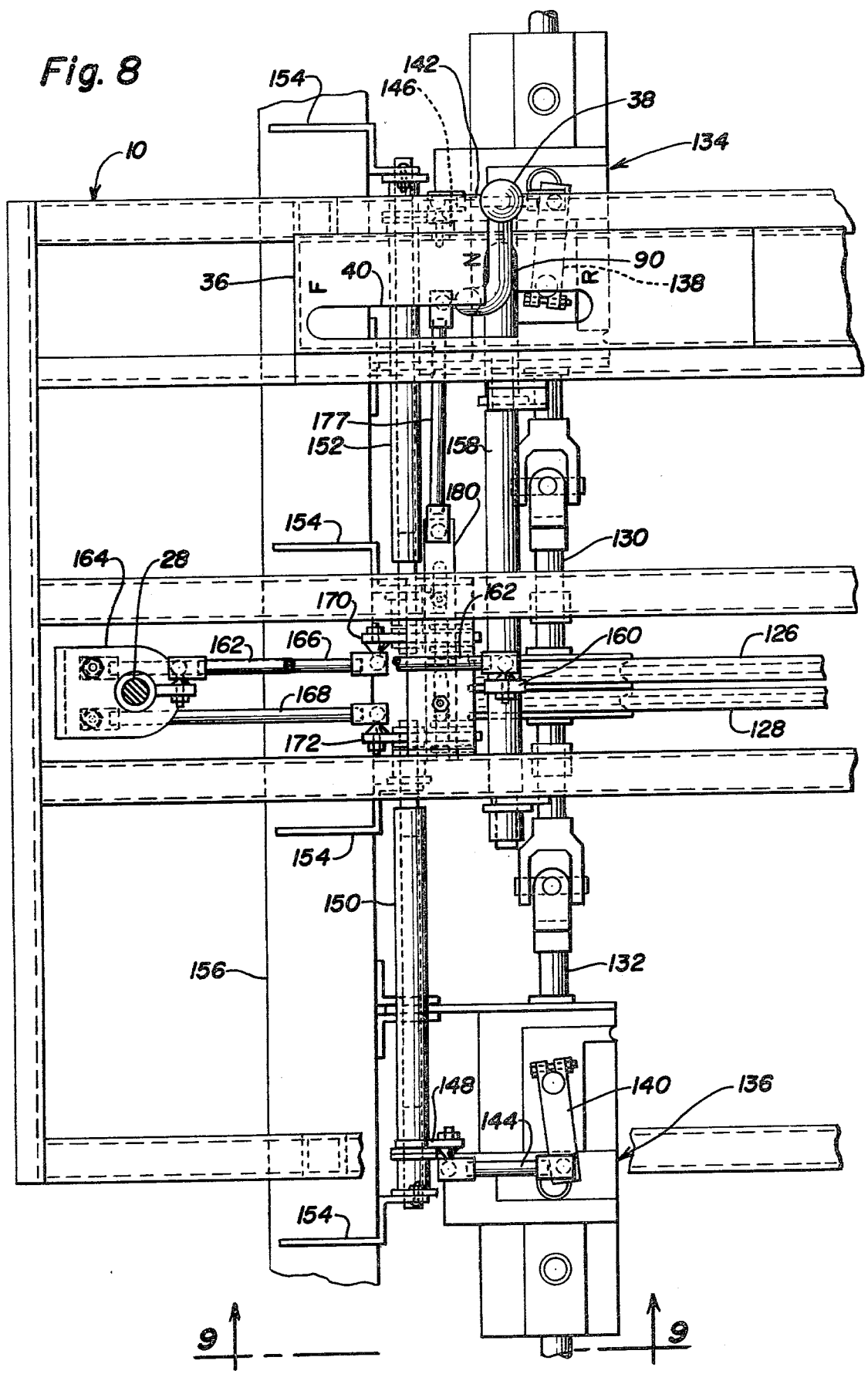
FIG. 8 is a fragmentary plan view of a second embodiment of the invention, similar to the view shown in FIG. 3 with respect to the first embodiment thereof and illustrating the relationship of the different elements of said second embodiment with respect to the speed control lever and the steering wheel shaft of the machine.
Figure 9:
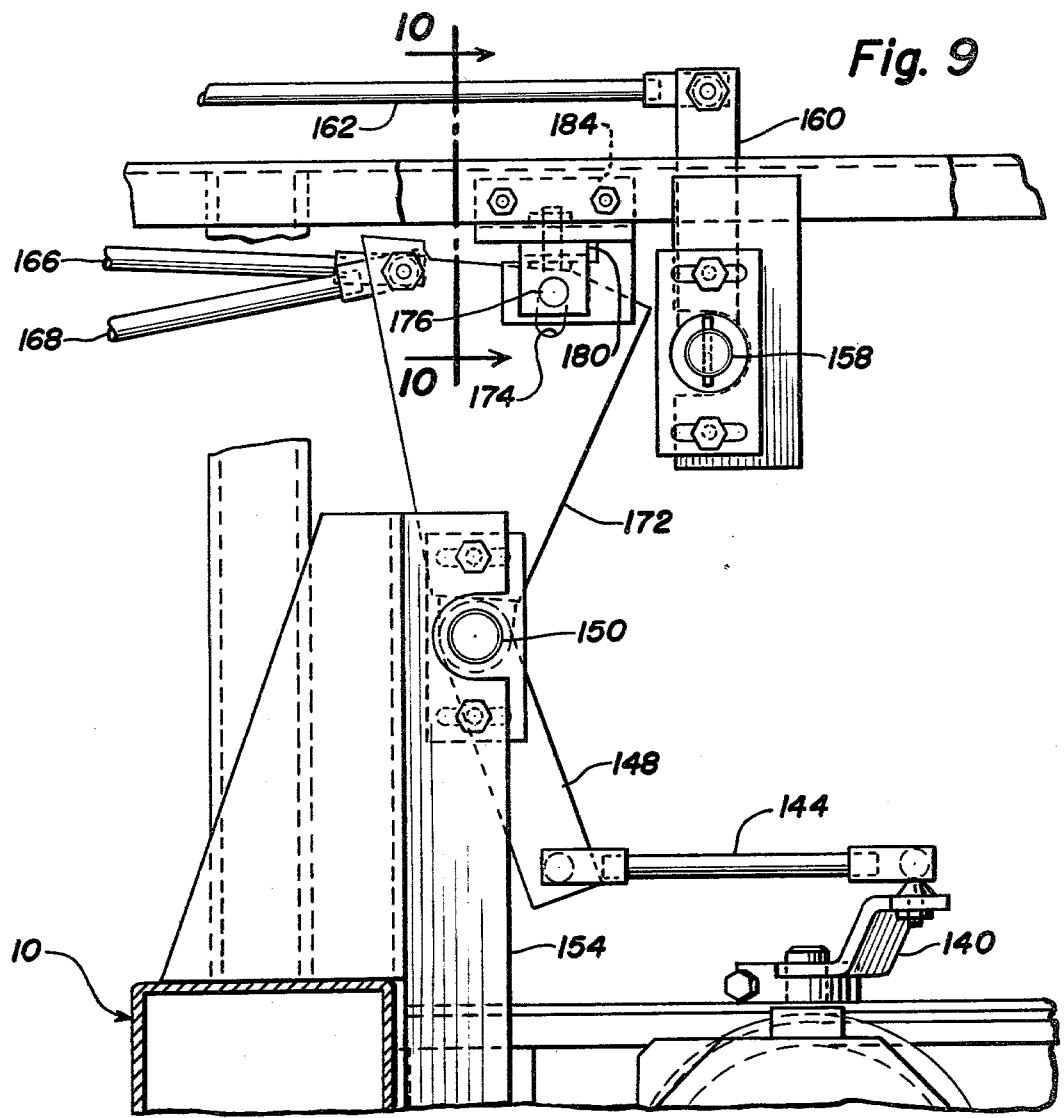
FIG. 9 is a fragmentary vertical elevation of the mechanism shown in FIG. 8, as seen on the line 9—9 thereof but shown in a larger scale than in FIG. 8.
Figure 10:
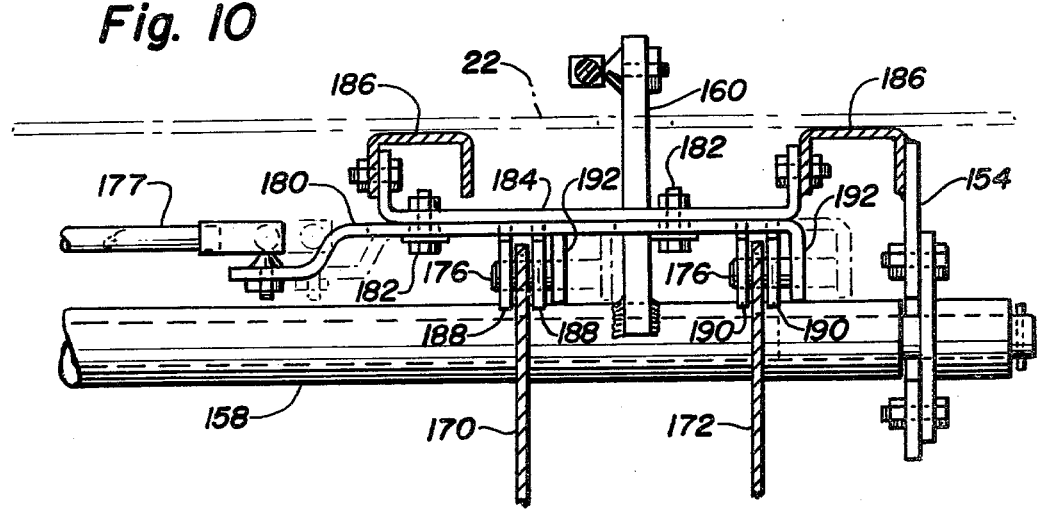
FIG. 10 is a fragmentary vertical sectional view of details of the mechanism shown in FIG. 9, as seen on the line 10—10 thereof and being on a still larger scale than employed in FIG. 9.

In the embodiment shown in FIG. 3, which is associated with a windrower in which the front drive wheels are closer together than in a mower-conditioner, the power means for the steering mechanism of which is shown in the additional embodiment illustrated in FIGS. 8–10, it will be seen that the steering shaft 28 is connected at its lower end to a U-shaped bracket 64, shown in FIGS. 1 and 3, the upper leg of the bracket being connected pivotally to one end of the link 66 and the lower leg of the bracket being connected to link 68. The opposite end of link 66 is connected pivotally to arm 70, which is fixed to shaft 62 and the opposite end of link 68 is connected pivotally to arm 72 which is fixed to shaft 60. Also, fixedly connected to shafts 60 and 62 are V-shaped plates 74 and 76, which comprise essential members of the safety mechanism described in detail hereinafter. They move in horizontal planes.

Bracket 64 which is connected to and supported by the lower end of steering shaft 28, which is swivelly supported at its upper end within the post means 26 is movable to a limited extent forwardly and rearwardly by means of rod 78, the forward end of which is pivotally connected to bracket 64 and the rearward end of which is an arm 80, which extends upward from shaft 82 supported between brackets 84 connected to portions of the frame 10, as clearly shown in FIG. 3.

Figure 6:
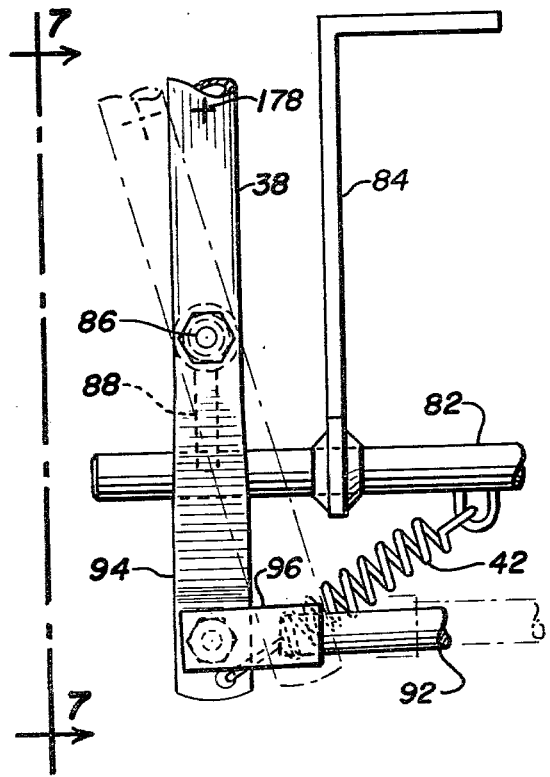
FIG. 6 is a fragmentary front elevation of additional details of the mechanism associated with the speed control handle, especially illustrating the biasing means therefor.
Figure 7:
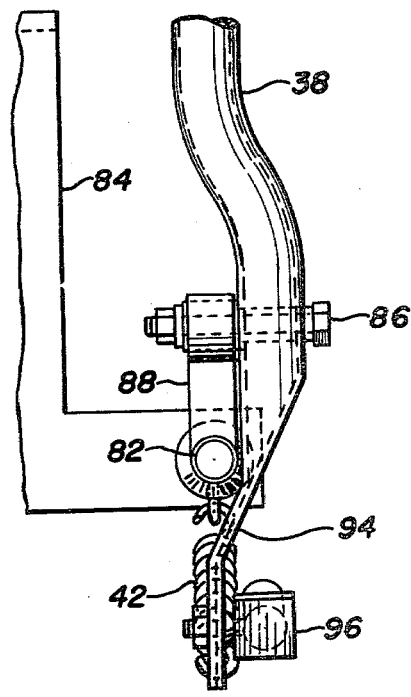
FIG. 7 is a fragmentary vertical side elevation of the mechanism shown in FIG. 6, as seen from the line 7—7 thereof.

Referring to FIGS. 6 and 7, the lower end of the speed control lever 38 is of irregular configuration and a short distance above the lower end thereof, is pivoted upon a bolt-like shaft 86 which extends through a bushing and the upper end of a short leg 88, the lower end of which is fixed, such as by welding, to the transversely extending shaft 82. In view of the fact that the leg 88 is fixed to shaft 82, however, the speed control lever 38 may also be pivotally moved about the axis of shaft 82 and this will move the upper end of the arm 80 forwardly or rearwardly, as desired, for purposes of shifting the rod 78 and thereby moving the bracket 64 in similar forward and rearward directions for purposes of angularly moving the arms 70 and 72 about the axes of shafts 60 and 62, thereby simultaneously moving said shafts for purposes of delivering equal amounts of fluid to the respective fluid motors 56 and 58. Hence, the speed control lever 38 can be moved either forwardly or rearwardly and thereby actuate the motors 56 and 58 to drive the drive wheels 16 forwardly or rearwardly and when the steering lever 38 is disposed in the neutral notch 90 of the slot 40, shown in FIG. 2, the engine 18 and pumps 52 and 54 may continue to move but without driving the wheel 16.

In addition to the speed control lever 38 controlling the speed of the hydraulic motors 56 and 58, it also actuates the safety mechanism referred to above when the lever 38 is moved about the axis of shaft 86, especially when such movement is biased counterclockwise, as viewed in FIG. 6, by spring 42. Actuation of the safety mechanism is accomplished by means of link 92 which is connected to the lower end of lever 38 by means of yoke 96.

Figure 5:
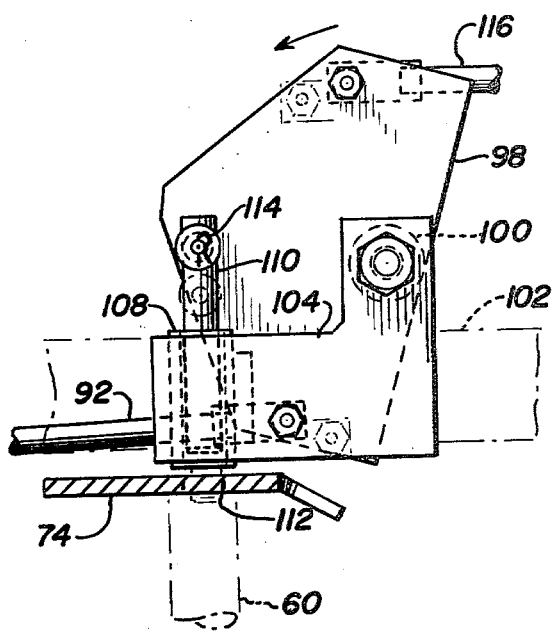
FIG. 5 is a horizontal fragmentary sectional view of the mechanism shown in FIG. 4, as seen on the line 5—5 thereof.

The opposite end of link 92, as shown in FIG. 4, is pivotally connected to another plate 98, a portion of which is pivotally supported upon a stud 100, which is fixed to a transverse frame member 102, by means of a plate-bracket 104, a portion of which projects above member 102, as seen in FIG. 5, and the opposite end of the plate-bracket 104 has a pair of parallel legs 106 between which a guide sleeve 108 is supported within which a vertically reciprocable locking pin 110 is disposed for engagement with a hole 112 in V-shaped plate 74 when the same has been moved to so-called neutral position by the speed control lever 38 when it is in its neutral position, illustrated in FIG. 2. Movement of the pin 110 is effected by the upper end thereof being engaged by a pin 114 which is fixed at one end to the plate 98.

For purposes of actuating the other hydraulic pump 54 by means of its shaft 62, an additional link 116 is connected pivotally at one end to the upper end of plate 98, as best shown in FIG. 5, and the opposite end is connected to another pivoted plate 118, similar to plate 98, which is pivotally supported upon a stud 120, supported by frame member 102 and actuating a similar vertically reciprocable locking pin 122 that is similarly supported to the frame member 102 by means of another plate-bracket 124. From the above, it will be seen that a single movement of the speed control lever 38 about the axis of shaft 86 simultaneously moves the locking pins 110 and 122, respectively, into holes in the plates 74 and 76 when the upper end of said lever is disposed in the neutral notch 90, shown in FIG. 2.

In view of the fact that movement of the steering wheel 34 in either direction from a neutral position thereof will initiate movement of the links 66 and 68, and correspondingly, energize the motors 56 and 58, accidental movement thereof can result in damage to either personnel or property, whereby the importance of the safety means comprising the present invention can be appreciated. Hence, when the locking pins 110 and 122 are disposed in the holes therefor in the plates 74 and 76, movement of the steering wheel 34 from the neutral position thereof is impossible, and thus, the engine 18 can continue to run, if desired, but no driving will be effected.

Referring to FIGS. 8–10, mechanism is illustrated therein by which the present invention is adapted to a mower-conditioner machine in which the drive wheels are spaced normally a greater distance apart than the drive wheels in a windrower, as indicated above. Accordingly, a somewhat different arrangement of drive means and safety means is necessary but, nevertheless, within the spirit of the invention described above with respect to the embodiment illustrated in FIGS. 1–7. Referring to FIG. 8, only the part of the machine which is different from that shown in FIGS. 1–7 is illustrated for purposes of preventing duplication of illustration and description. In FIG. 8, for example, it will be seen that a pair of drive belts 126 and 128 extend from a gear box, not shown, which is driven, for example, by the engine 18 for purposes of driving shafts 130 and 132 which respectively drive the hydrostatic units 134 and 136, which correspond to the units 46 and 48 in the preceding embodiment. Arms 138 and 140 extend laterally from the control shaft of the hydraulic pumps of each of the hydrostatic units and said arms are actuated by links 142 and 144, which, in turn, are actuated by arms 146 and 148, which extend upward respectively from horizontal shafts 150, 152. The other ends of said shafts are supported in suitable brackets 154, which extend from a suitable transverse frame member 156. A rockable shaft 158 has an arm 160 fixed thereto which extends upwardly therefrom for connection to one end of a link 162, the opposite end of which is connected to bracket 164 that is supported by the lower end of the steering shaft 28, as in the preceding embodiment. Bracket 164 corresponds to bracket 64 in the preceding embodiment for movement forwardly and rearwardly when rockable shaft 158 is moved about its axis due to being connected to the lower end of the speed control lever 38, as in the preceding embodiment. Accordingly, equal delivery of fluid to the hydraulic motors of the hydrostatic unit 134 and 136 will be achieved in view of the fact that the bracket 164 simultaneously moves links 166 and 168, the rearward end of which respectively are connected to similar V-shaped plates 170 and 172, which operate in vertical planes, as distinguished from the horizontal planes in which the plates 74 and 76 of the preceding embodiment operate. As viewed in FIG. 9, the plate 170 is directly in line with the plate 172. Each of said plates also have a short slot comprising an elongated hole 174 into which locking pins 176 are extended by operation of the lower end of the speed control lever 38, said lower end being connected to one end of link 177, shown in FIGS. 8 and 10, it being understood that the speed control lever 38, in the embodiment of FIGS. 8–10, will be supported pivotally at a higher location, such as shown by the exemplary mark 178 in FIG. 6. The opposite end of the link 177 is connected to a slidable plate 180, which is supported by a pair of guide bolts 182, see FIG. 10, which extend through slots in the plate 180, and also are secured to a fixed horizontal bracket 184, which extends between a pair of frame members 186 immediately below the floor 22 of the machine.

As seen particularly in FIG. 10, the horizontal bracket 184 has two pairs of spaced ears 188 and 190 extending downwardly therefrom and sufficiently spaced to receive the V-shaped plates 170 and 172 therebetween. Said ears also have axially aligned holes adequate to receive the locking pins 176 therethrough incident to the same being moved by the plate 180. The pins are of a cantilever type and are fixed at one end to downwardly extending ears 192 fixed to and movable with the slidable plate 180. In normal operation, the pins 176 are never retracted through both of the ears of each pair but, in idle position, are retained within the holes in the ears 188 and 190 which are nearest the movable ears 192, thereby aiding in guiding and supporting the locking pins 176 when the slidable plate 180 is moved toward the left, as viewed in FIG. 10, incident to link 177 being actuated by pivotal movement of speed control lever 38 within a plane parallel to the transverse axis of the frame 10, such movement of the speed control lever being transverse to the plane in which it moves to simultaneously vary both the speed and direction of movement of the hydrostatic units 134 and 136.

It also will be understood in regard to the second embodiment of the invention that the lower end of the speed control lever 38 is biased into the neutral slot 90 in a similar manner to its biased movement in the preceding embodiment illustrated in FIGS. 1–7. Accordingly, when it is desired to render the machine safe against accidental movement, the steering wheel is moved suitably to neutral position and the speed control lever 38 also is moved to its neutral position in which it is biased automatically into the safety notch 90, and such biasing movement injects the locking pins 176 through the slot-holes 174 of the V-shaped plates 170 and 172 and thereby locks the machine in safe condition against accidental movements, such as if the steering wheel were accidentally moved in one direction or the other without such safety means being present.

The foregoing description illustrates preferred embodiments of the invention. However, concepts employed may, based upon such description, be employed in other embodiments without departing for the scope of the invention. Accordingly, the following claims are intended to protect the invention broadly, as well as in the specific forms shown herein.

I claim:

1. In a self-propelled harvesting machine adapted to cut and arrange forage crops in swaths or windrows comprising a mobile frame, having a pair of drive wheels at opposite sides, an engine connected to a pair of hydrostatic units respectively connected to said drive wheels, a steering wheel on a rotatable shaft for manual manipulation in opposite directions from a neutral position, linkage means connected between said shaft and hydrostatic units and operable when rotated to vary the relative speeds of said drive wheels and thereby steer the machine in desired directions, and a speed control lever movably mounted about one axis for manual manipulation in opposite forward speed and reverse speed directions from a neutral position and interconnected to said linkage means for equally varying the speed and direction of rotation of said drive wheels, said lever also being movable about another axis transverse to said one axis only when in said neutral position; the improvement comprising safety means including similar members respectively movable with said linkage means simultaneously, locking members, means responsive to movement of said speed control lever in one direction about said another axis to project said locking members respectively into locking engagement with said similar members, said engagement locking said linkage means only when said steering wheel is in said neutral position, and means for biasing said speed control lever in said one direction.

2. The machine according to claim 1 further including a slot in which said speed control lever is movable about said one axis and said slot having a lateral offset at the neutral position of said lever, and said biasing means being automatically operable to move said lever about said another axis and into said lateral offset of said slot to lock the machine against movement.

3. The machine according to claim 2 in which said speed control lever is pivotally connected to a short shaft on the upper end of a short leg connected to another shaft extending transversely between opposite sides of said frame, said short shaft being transverse to said another shaft, whereby when said lever is moved about said short shaft it moves said locking members into engagement with said similar members, whereas movement of said lever about the axis of said another shaft varies the speed and direction of movement of said drive wheels.

4. The machine according to claim 1 in which said similar members are plates, each having a hole therein and said locking members are short pins projectable into said holes in said members plates, said holes being positioned in said plates for reception of said pins only when the steering wheel is in the neutral position.

5. The machine according to claim 4 in which said plates are horizontal and said locking pins are moved vertically relative to the holes in said plates.

6. The machine according to claim 4 in which said plates are in vertical parallel planes and are pivotally movable about a common horizontal axis, and said locking pins being coaxial and spaced axially for simultaneous reception within the holes in said plates by axial movement thereof horizontally.

7. The machine according to claim 6 further including a horizontal plate slidably supported between operative and inoperative positions thereof, ears on said plate extending perpendicularly from spaced locations on one surface of said plate, and said locking pins being supported respectively upon said ears and projecting in similar directions therefrom along a common axis.

8. The machine according to claim 7 in which said vertical plates have an arcuate outer edge opposite the pivotal axis thereof and said slidable plate is supported by a horizontal bracket fixed relative to said frame, said bracket having two pairs of spaced ears fixed perpendicularly to said bracket and spaced apart respectively to receive between the ears of each pair thereof said arcuate outer edges of said vertical plates, and said ears having axially aligned holes transversely therein through which said locking pins project when intersecting the locking holes in said vertical plates to securely support said pins in locked position relative to said plates.

* * * * *